United States Patent [19]

Wrathall et al.

[11] Patent Number: 5,782,144
[45] Date of Patent: Jul. 21, 1998

[54] VEHICLE TRANSMISSION

[75] Inventors: Anthony Wrathall, Wrexham; John Pius Burke, Whitchurch, both of United Kingdom

[73] Assignee: JCB Transmissions, Staffordshire, United Kingdom

[21] Appl. No.: 700,226

[22] Filed: Aug. 20, 1996

[30] Foreign Application Priority Data

Aug. 26, 1995 [GB] United Kingdom ............... 9517582

[51] Int. Cl.[6] ............................................... F16H 3/08
[52] U.S. Cl. ........................................ 74/664; 74/665 B
[58] Field of Search ....................... 74/664, 665 A, 74/665 B, 665 D, 665 E

[56] References Cited

U.S. PATENT DOCUMENTS

| 2,704,468 | 3/1955 | Horton et al. ............... 74/688 |
| 2,943,515 | 7/1960 | Isaacson et al. ............. 74/730 |
| 3,400,609 | 9/1968 | Utter ........................... 74/688 |
| 3,446,094 | 5/1969 | Kazuhiko et al. ........... 74/664 |
| 3,557,635 | 1/1971 | Tuck ............................ 74/731 |
| 3,982,599 | 9/1976 | Herscovici ................. 180/53 R |
| 4,056,990 | 11/1977 | Hatano ...................... 74/781 |
| 4,289,044 | 9/1981 | Dorpmund et al. ........ 74/688 |
| 4,462,276 | 7/1984 | Takano ....................... 74/866 |
| 4,483,212 | 11/1984 | Ohtsuka ..................... 74/688 |
| 4,724,720 | 2/1988 | Ohkubo ...................... 74/677 |

FOREIGN PATENT DOCUMENTS

| 0004045 | 4/1982 | European Pat. Off. . |
| 0088188 | 9/1983 | European Pat. Off. . |
| 0110538 | 6/1984 | European Pat. Off. . |
| 0047667 | 12/1985 | European Pat. Off. . |
| 0040864 | 5/1986 | European Pat. Off. . |
| 0208063 | 1/1987 | European Pat. Off. . |
| 0208840 | 1/1987 | European Pat. Off. . |
| 493380 | 8/1971 | U.S.S.R. . |
| 1159872 | 2/1967 | United Kingdom . |
| 2032543 | 5/1980 | United Kingdom . |
| 2078318 | 1/1982 | United Kingdom . |
| 2122703 | 1/1984 | United Kingdom . |
| 2199624 | 7/1987 | United Kingdom . |
| 2186333 | 8/1987 | United Kingdom . |
| 2249362 | 5/1992 | United Kingdom . |
| WO89/01100 | 2/1989 | WIPO . |

*Primary Examiner*—Dirk Wright
*Attorney, Agent, or Firm*—Arnold B. Silverman; Benjamin T. Queen, II; Eckert Seamans Cherin & Mellott, LLC

[57] ABSTRACT

A vehicle transmission comprising:

a first input for connection to a prime mover of the vehicle;

an output for connection to ground-engaging wheels of the vehicle;

multi-ratio transmission means operable to provide a driving connection, at a selected one of a number of gear ratios, between said first input and said output;

a further input for connection to the prime mover of the vehicle;

means operable to provide a driving connection between said further input and said output via at least part of said multi-ratio transmission means.

16 Claims, 2 Drawing Sheets

VEHICLE TRANSMISSION

BACKGROUND TO THE INVENTION

This invention relates to a transmission for a vehicle, for interposition between a prime mover of the vehicle and a ground-engaging means of the vehicle and providing a plurality of gear ratios by which the ground-engaging means can be driven by the prime mover. A transmission in accordance with the invention has been devised primarily, although not exclusively, for a vehicle such as a tractor or loader type of vehicle for industrial and/or agricultural use, for example a vehicle of the kind commonly known as a "back-hoe loader", and in such a vehicle the ground-engaging means comprises wheels. However, the invention is also applicable to vehicles in which the ground-engaging means comprises crawler tracks.

Vehicles such as tractors or loaders conventionally have utilised transmissions which provide a relatively small number of different gear ratios, for example four ratios. Since the ratios have to cope with drive requirements of the vehicle both on the farm or industrial site and also when the vehicle is being driven on the road, the limited number of ratios means that such vehicles may have a relatively low top road speed. It has been proposed to provide such vehicles with an additional drive line which enables a further gear ratio to be provided, the further drive line not including a torque converter which is included in the main drive line of the vehicle. This is disclosed in International Patent Application Publication No. WO89/01100. There is an interlock which prevents simultaneous connection of drive by way of the multi-ratio transmission and the independent drive line.

It is broadly the object of the present invention to provide a vehicle transmission having an improved arrangement of an additional transmission path providing a further gear ratio.

SUMMARY OF THE INVENTION

According to one aspect of the present invention, we provide a vehicle transmission comprising:

a first input for connection to a prime mover of the vehicle;

an output for connection to ground-engaging means of the vehicle;

multi-ratio transmission means operable to provide a driving connection, at a selected one of a number of gear ratios, between said first input and said output;

a further input for connection to the prime mover of the vehicle;

means operable to provide a driving connection between said further input and said output via at least part of said multi-ratio transmission means.

Said means operable to provide a driving connection between said further input and said output may include a common gear which also provides a said driving connection between said first input and said output.

Said common gear may mesh with a further gear which is drivingly connectable by a clutch to said further input and the common gear may be drivingly connectable by a clutch to said first input.

There may be provided means operable in accordance with an operating parameter of the vehicle selectively to provide for a driving connection to be established either between said first input and the output or said second input and the output.

According to another aspect of the present invention, we provide a vehicle transmission comprising:

a first input for connection to a prime mover of the vehicle;

an output for connection to ground-engaging means of the vehicle;

multi-ratio transmission means operable to provide a driving connection, at a selected one of a number of gear ratios, between said first input and said output;

a further input for connection to the prime mover of the vehicle;

means operable to provide a driving connection between said further input and said output;

and means operable in accordance with an operating parameter of the vehicle selectively to provide for a driving connection to be established either between said first input and the output or said second input and the output.

Preferably the operating parameter of the vehicle in accordance with which a driving connection is established between the first input and the output or the further input and the output is a speed parameter. Preferably it comprises the vehicle speed, which conveniently may be derived from a sensor for the speed of the output of the transmission.

Said driving connection between said further input and said output may, as in accordance with the first aspect of the invention, be by way of a part of said multi-ratio transmission means. Preferably it is not by way of at least a further part of said multi-ratio transmission means.

Preferably the driving connection between the further input and output of the transmission provides a higher transmission ratio (by which we mean a higher vehicle speed in relation to a given speed of the prime mover of the vehicle) than the highest gear ratio provided by the multi-ratio transmission means between the first input of the transmission and the output. Thus, this driving connection preferably relates to an overdrive transmission ratio.

Preferably the multi-ratio transmission means is operable to select a required ratio under the control of a driver of the vehicle, whilst the means providing a driving connection between the further input and output is arranged to be brought into operation, and the driving connection between the first input and the output discontinued, only when the driver has selected the highest gear ratio of the multi-ratio transmission means.

In a vehicle, preferably the first input is connected to the prime mover of the vehicle by way of a torque convertor whilst the further input is connected to the prime mover of the vehicle without the operative interposition of such a torque convertor (although it will be appreciated that a mechanical connection between the further input and prime mover might involve a part or parts of the torque convertor, for example the casing thereof which has a non-slipping connection to the output of the prime mover).

Preferably the transmission is one in which the driving connections between the first input and the output, and between the further input and the output, are provided by engagement of a selected one or ones of a number of fluid-pressure operable clutches in the transmission, application of fluid pressure to the appropriate clutch(es) being by way of the operation of electrically controlled valve means whose operation is determined by a suitable electrical control circuit.

Preferably the electrical control circuit includes driver-operable switch means for controlling selection of the gear ratios in the multi-ratio transmission means, and switch means operable automatically, in accordance with said speed parameter, when the switch means relating to the highest gear ratio of the multi-ratio transmission means has been selected.

BRIEF DESCRIPTION OF THE DRAWINGS

The invention will now be described by way of example with reference to the accompanying drawings, of which.

DESCRIPTION OF THE PREFERRED EMBODIMENTS

Figure 1:
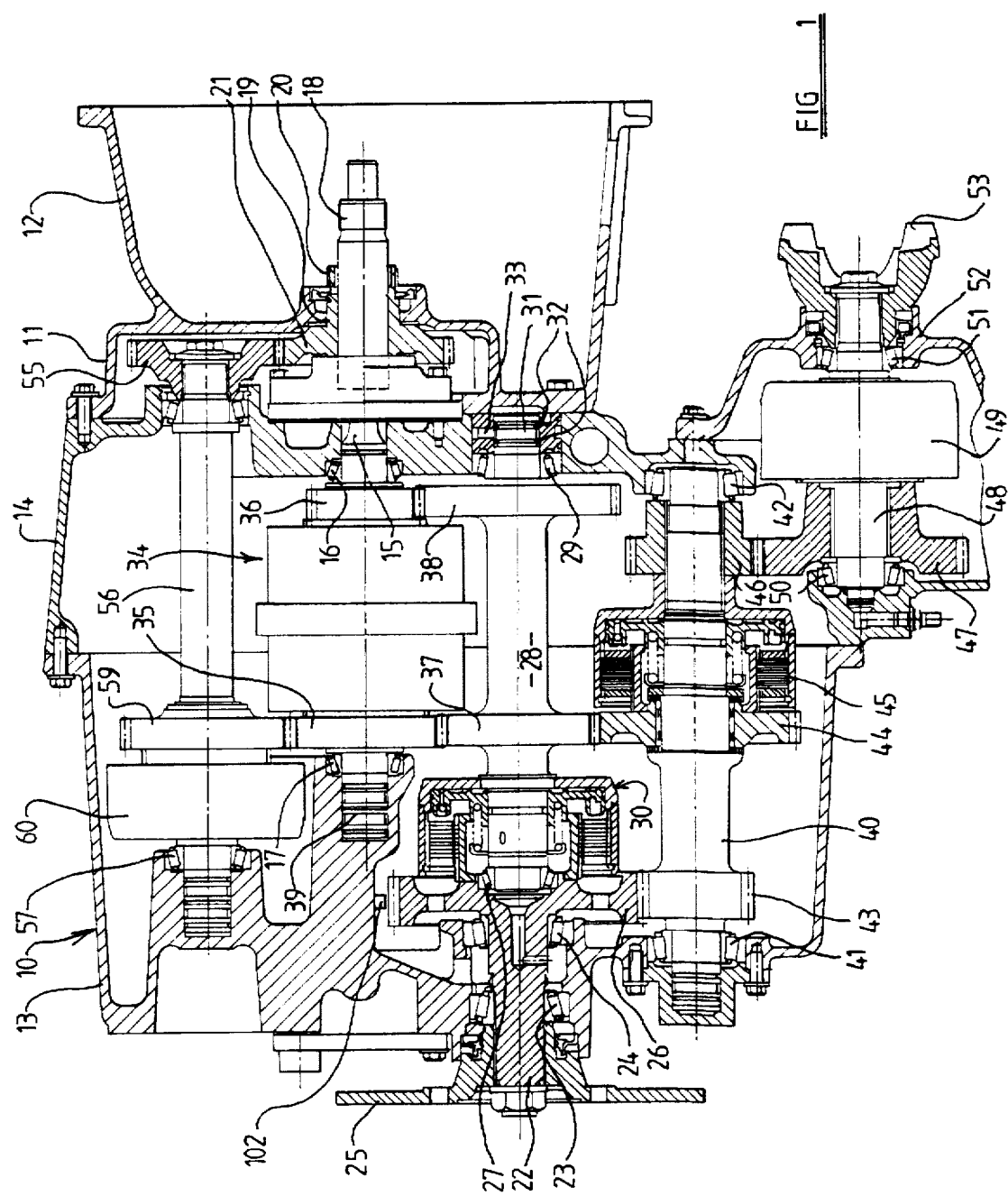
FIG. 1 is a diagrammatic partial section through a transmission in accordance with the invention, showing the main operative components thereof.

Referring firstly to FIG. 1 of the drawings, a transmission T for a vehicle such as a loader or tractor comprises a casing indicated generally at 10, constituted by a number of casing parts held together by bolts. One of the casing parts, indicated at 11, includes a portion 12 which is generally in the form of a bell-housing for connection to a prime mover in the form of an internal combustion engine E. The casing portion 11 forms one end of the casing of the transmission; the opposite end of the casing is afforded by a casing portion 13 and there is an intermediate casing portion 14.

An input shaft 15 is supported in taper roller bearings 16, 17 in the casing portions 14, 13 respectively. The input shaft 15 protrudes through the casing portion 11 into the bell-housing portion 12 thereof, ending in a splined portion 18 for engagement with the output member of a torque convertor C, disposed within the bell housing portion 12 and whose input is connected to an output, such as the crankshaft, of the internal combustion engine E.

Rotatable on the outside of the input shaft 15 there is a further input in the form of an input sleeve 19 which has a splined end portion 20 for torque transmitting connection to a member such as the casing A of the torque convertor C which provides a direct driving (i.e. non-slipping) connection with the output of the prime mover. Within the casing portion 11, the input sleeve has a gear 21.

An output shaft 22 is supported in the casing portion 13, in taper roller bearings 23, 24. Outside the casing portion 13, the output shaft 22 has an output drive flange 25 secured thereto, for connection with further drive line components leading to a ground-engaging means of the vehicle. In the example herein described, such components may be a differential gearing and/or one or more universally jointed drive shafts, for connection to a pair of road wheels of a vehicle. Within the casing, the output shaft 22 has a portion in the form of an output gear 26, and within the output gear 26 there is supported in a bearing 27 one end of a main shaft 28. The other end of the main shaft 28 is carried by a bearing 29 in the casing portion 14. The end of the main shaft 28 adjacent the output gear 26 carries a clutch assembly 30 which is a multi-plate hydraulically operable clutch assembly whereby a torque-transmitting connection can be established between the main shaft 28 and the output gear 26. The clutch assembly 30 is generally conventional in its construction and will not therefore be described in detail herein; it comprises a plurality of interleaved annular plates respectively rotationally fast with a clutch drum and a clutch hub which in turn are rotationally fast with the main shaft 28 and output gear 26, respectively. The plates are arranged to be brought into frictional torque-transmitting connection with one another when the clutch is supplied with hydraulic fluid under pressure, such fluid being introduced by way of a drilling down the centre of the main shaft and operating a piston incorporated in the clutch assembly. Hydraulic fluid is introduced to such drilling by way of an annular groove on the exterior of the opposite end of the main shaft, as indicated at 31, the groove 31 lying between two rotary seals 32 and the hydraulic fluid being introduced to the region between the seals by way of a passage 33. Such supply of hydraulic fluid is under the control of a solenoid valve as described hereafter.

The input shaft 15 carries a forward clutch assembly indicated generally at 34. The clutch assembly 34 comprises two clutches each of which is generally as the clutch assembly 30 and which respectively provide for clutching of gears 35, 36 to the input shaft 15. The gears 35, 36 mesh respectively with gears 37, 38 on the main shaft 28, so that the main shaft can be driven from the input shaft at a gear ratio dependent on which of the clutches in the clutch assembly 34 is engaged to drive either the gear 35 or the gear 36. The clutches in the clutch assembly 34 are individually hydraulic fluid pressure operated, and indicated generally at 39 is an arrangement of two annular grooves between rotary seals, for feeding hydraulic fluid to the appropriate clutch by way of drillings extending longitudinally of the input shaft 15.

A layshaft 40 is supported by bearings 41, 42 in the casing parts 13, 14. The lay shaft is provided with a gear 43 which meshes with the output gear 26, and carries at an intermediate position a gear 44 which is rotatably supported on the layshaft but is able to be clutched thereto by a clutch assembly 45, the clutch assembly 45 being substantially identical to the clutch assembly 30 and operable in like manner. The gear 44 meshes with the gear 37 on the main shaft. The layshaft also non-rotatably carries a gear 46.

The gear 46 meshes with a further gear 47 supported on an additional output shaft 48 and able to be clutched thereto by a clutch assembly 49 which once again is of the type above described. The shaft 48, supported in bearings 50, 51, extends out of an additional casing portion 52 and carries a drive member 53 for connection, by way of other drive line components such as universally jointed shafts and so on, to further drivable wheels of the vehicle. In a typical vehicle, the output at the drive member 53 would be brought into use, by engagement of the clutch assembly 49, only when the vehicle is required to be used in "fourwheel drive" mode, the vehicle normally being used with two wheels only driven from the output shaft 22.

The gear 21 on the additional input sleeve 19 meshes with a gear 55 fast on the end of a shaft 56 supported in bearings 57, 58. A gear 59 is able to be clutched to the shaft 56 by a further clutch assembly 60 which also is of the hydraulic pressure operable type above described. The gear 59 meshes with the gear 35.

The transmission above described thus enables a first drive path to be established between the input shaft 15 and the output shaft 22 by engagement of either of the clutches in the clutch assembly 34 on the shaft 15 to the main shaft 28. The main shaft 28 is connectable to the output shaft 22 by either the clutch assembly 30 to give a direct drive or indirectly by way of the gear 44 and the clutch assembly 45 on the layshaft 40, gear 43, and output gear 26, to the output shaft 22. Thus a multi-ratio transmission means is provided having a total of four selectable gear ratios, and each of these is by way of the torque convertor. Alternatively, neither of the clutches in the clutch assembly 34 may be engaged and the clutch 60 may be engaged to provide a further gear ratio as a result of a second drive path between the additional input sleeve 19 and the output shaft 22 via the main shaft 28 and clutch assembly 30. Since the input sleeve 19 is connected to the casing of the torque convertor, a direct (i.e. non-slipping) driving connection is established between the prime mover of the vehicle and the wheels thereof, at the further gear ratio which preferably is a higher gear ratio then the highest selectable gear ratio available by way of the torque convertor. The gears 35 and 37 are common gears to both drive paths. Thus, the second drive path from the input means 19 to the output shaft 22 includes a part of the multi-ratio transmission means, but omits a further part thereof.

Illustrated at 102 in FIG. 1 of the drawings, the transmission is additionally provided with an output speed sensor. This may be a magnetic sensor or any other appropriate type of sensor, mounted in the casing of the transmission and having a sensing portion disposed in proximity to the periphery of the output gear 26 to provide a direct measurement of the output speed of the transmission and thus of the road speed of the vehicle.

Figure 2:
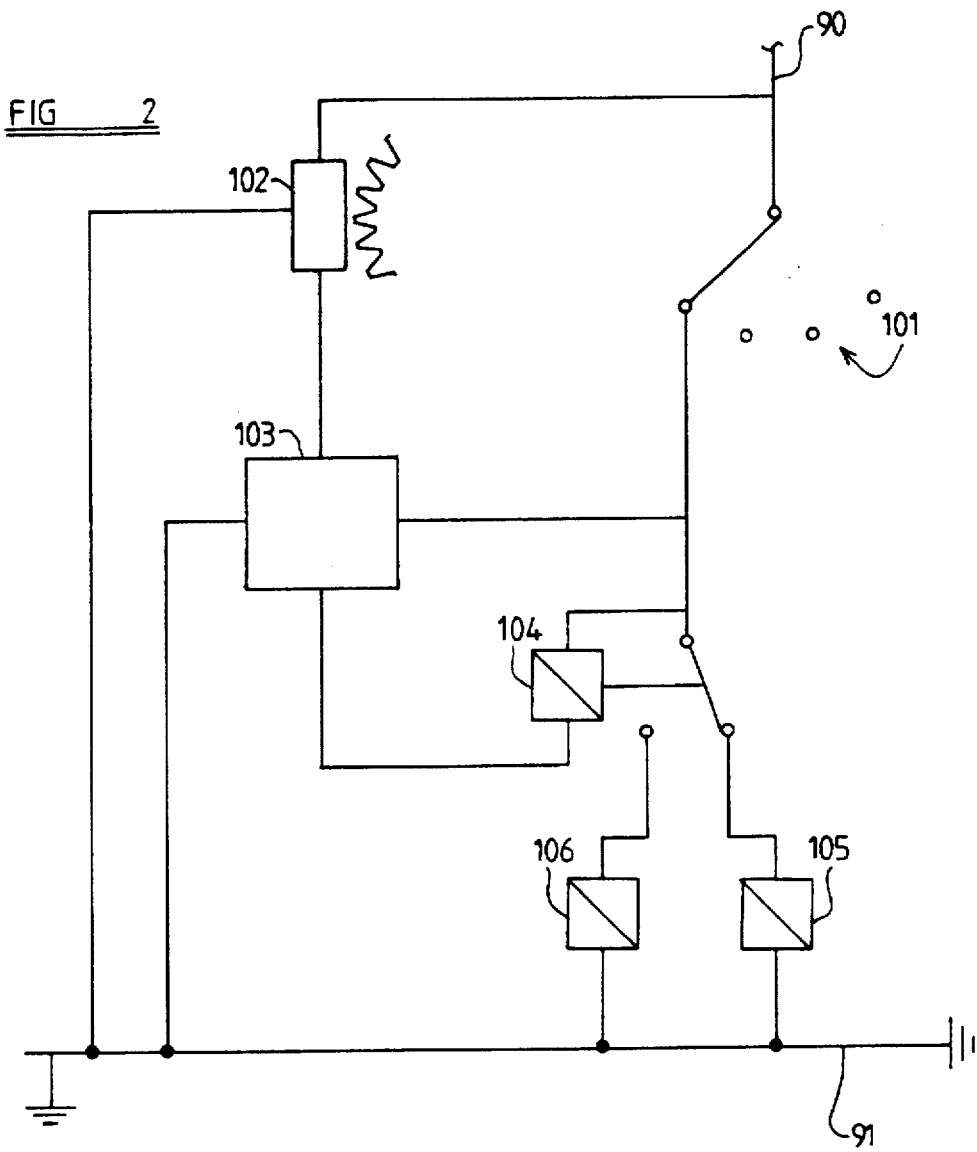
FIG. 2 is a diagrammatic electrical circuit of part of the transmission.
Figure 3:
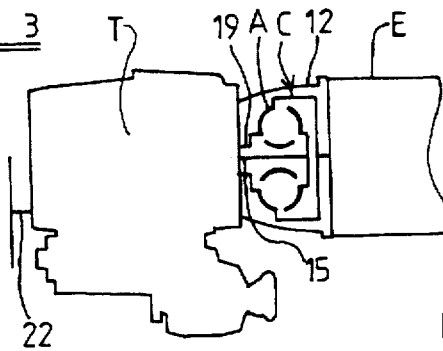
FIG. 3 is a diagrammatic plan view with parts omitted for clarity of a vehicle to which the transmission of FIGS. 1 and 2 is fitted.
Figure 4:
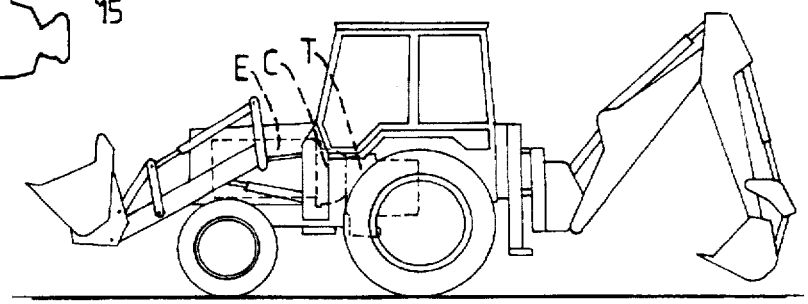
FIG. 4 is a diagrammatic sectional view of the vehicle of FIG. 3.

Supply of hydraulic fluid under pressure to the clutches of the transmission to provide the drive paths and gear ratios as above described is by way of solenoid-operated valves under the command of a suitable electrical control circuit. Part of such an electric control circuit is shown in FIG. 2 of the drawings. In FIG. 2, the power supply of a vehicle is indicated at 90 and ground or earth, e.g. the chassis of the vehicle or wiring provided thereon, at 91. Connected to the power supply 90 is a gear selector switch 101 which is operable between four positions under the control of the driver of the vehicle to energise appropriate solenoid valves to engage the appropriate ones of the clutch assemblies 30, 34 and 45 to provide the required one of the four available gear ratios. One only of such solenoid valves is indicated at 105 this being the solenoid valve which provides the highest gear ratio of the four available ratios.

Also connected between the power supply 90 and earth 91 is a transmission speed sensor 102 which measures the speed of the output gear 26 and thus of the output shaft 22. The speed signal derived from the sensor 102 is sent to a switching unit 103 which, in accordance with the speed, controls a relay 104. The relay 104 switches between the fourth speed solenoid valve 105 and a fifth speed solenoid valve 106 which causes the drive paith to he established by way of the clutch assembly 60 to provide a fifth, overdrive, gear ratio between the casing of the torque convertor and the Output shaft.

The method of operation is as follows. When the driver of the vehicle selects fourth gear by means of the switch 101, then the fourth speed solenoid valve 105 is energised and the appropriate clutches engaged to afford the fourth gear ratio. When the signal from the speed sensor 102 indicates that a change to fifth gear would result in an engine speed greater than a predetermined value, e.g. 1500 rpm, then the switching unit 103 causes the relay 104 to be energised and switch electrical power from the fourth speed solenoid 105 to the fifth speed solenoid 106. Thus fifth gear is engaged. When the signal from the speed sensor 102 indicates that engine speed has dropped below a predetermined further value, e.g. 1400 rpm, then the switching unit 103 causes the relay 104 to be de-energised. Thus the fifth speed solenoid 106 is de-energised and the fourth speed solenoid 105 re-energised, causing the transmission to revert to fourth gear.

The transmission and control method described above has several advantages. It can make use of an existing gear selector switch 101, and provide for automatic changing between fourth and fifth gears in accordance with vehicle speed. Fifth gear can only engage after fourth gear has been selected by the driver of the vehicle. It is not possible to stall the engine of the vehicle because fifth speed direct drive reverts to fourth speed by way of the torque convertor automatically when the engine speed falls below, e.g. 1400 rpm. Additionally, the sensor 102 can be used as a speed sensor for an electronically operated vehicle speed indicator.

The features disclosed in the foregoing description, or the accompanying drawings, expressed in their specific forms or in terms of a means for performing the disclosed function, or a method (or process for attaining the disclosed result, as appropriate, may, separately or in any combination of such features, be utilised for realising the invention in diverse forms thereof.

We claim:

1. A vehicle transmission comprising:

a first input for connection to a prime mover of the vehicle;

an output for connection to ground-engaging wheels of the vehicle;

multi-ratio transmission means operable to provide a driving connection, at a selected one of a number of gear ratios, between said first input and said output;

a further input for connection to the prime mover of the vehicle;

means operable to provide a driving connection between said further input and said output via at least part of said multi-ratio transmission means;

wherein the driving connection between the further input and said output of the transmission provides a higher transmission ratio than the highest gear ratio provided by the multi-ratio transmission means between the first input of the transmission and said output; and the multi-ratio transmission means is operable to select a required ratio under the control of a driver of the vehicle, whilst the means providing a driving connection between the further input and output is arranged to be brought into operation, and the driving connection between the first input and the output discontinued, only when the driver has selected the highest gear ratio of the multi-ratio transmission means.

2. A transmission according to claim 1 wherein said means operable to provide a driving connection between said further input and said output includes a common gear which also provides a said driving connection between said first input and said output.

3. A transmission according to claim 2 wherein said common gear meshes with a further gear which is drivingly connectable by a clutch to said further input and the common gear is drivingly connectable by a clutch to said first input.

4. A transmission according to claim 1 comprising means operable in accordance with a sensing means for an operating parameter of the vehicle selectively to provide for a driving connection to be established either between said first input and the output or said further input and the output.

5. A transmission according to claim 4 wherein the operating parameter of the vehicle in accordance with which a driving connection is established between the first input and the output or the second input and the output is a speed parameter.

6. A transmission according to claim 5 wherein said speed parameter comprises the vehicle speed, which is derived from the speed of the output of the transmission.

7. A transmission according to claim 6 wherein said driving connection between said further input and said output is provided otherwise than by way of a part of said multi-ratio transmission means.

8. A transmission according to claim 1 wherein the first input is connected to the prime mover of the vehicle by way of a torque convertor whilst the further input is connected to the prime mover of the vehicle without the operative interposition of a torque convertor.

9. A transmission according to claim 1 wherein driving connections between the first input and the output, and between the further input and the output, are provided by engagement of a selected one or ones of a number of fluid-pressure operable clutches in the transmission.

10. A transmission according to claim 9 wherein application of fluid pressure to the appropriate clutch is by way of the operation of electrically controlled valve means whose operation is determined by an electrical control circuit.

11. A transmission according to claim 10 wherein the electrical control circuit includes driver-operable switch means for controlling selection of the gear ratios in the multi-ratio transmission means, and switch means operable automatically, in accordance with operating parameter of the vehicle, when the switch means relating to the highest gear ratio of the multi-ratio transmission means has been selected.

12. A vehicle transmission comprising:

a first input for connection to a prime mover of the vehicle;

an output for connection to ground-engaging means of the vehicle;

multi-ratio transmission means operable to provide a driving connection, at a selected one of a number of gear ratios, between said first input and said output;

a further input for connection to the prime mover of the vehicle;

means operable to provide a driving connection between said further input and said output;

and means operable in accordance with a sensing means for an operating parameter of the vehicle selectively to provide for a driving connection to be established either between said first input and the output or said second input and the output, wherein the driving connection between the further input and said output of the transmission provides a higher transmission ratio than the highest gear ratio provided by the multi-ratio transmission means between the first input of the transmission and said output; and the multi-ratio transmission means is operable to select a required ratio under the control of a driver of the vehicle, whilst the means providing a driving connection between the further input and output is arranged to be brought into operation, and the driving connection between the first input and the output discontinued, only when the driver has selected the highest gear ratio of the multi-ratio transmission means.

13. A transmission according to claim 12 wherein the first input is connected to the prime mover of the vehicle by way of a torque convertor whilst the further input is connected to the prime mover of the vehicle without the operative interposition of a torque convertor.

14. A transmission according to claim 12 wherein driving connections between the first input and the output, and between the further input and the output, are provided by engagement of a selected one or ones of a number of fluid-pressure operable clutches in the transmission.

15. A transmission according to claim 14 wherein application of fluid pressure to the appropriate clutch is by way of the operation of electrically controlled valve means whose operation is determined by an electrical control circuit.

16. A transmission according to claim 15 wherein the electrical control circuit includes driver-operable switch means for controlling selection of the gear ratios in the multi-ratio transmission means, and switch means operable automatically, in accordance with said operating parameter of the vehicle, when the switch means relating to the highest gear ratio of the multi-ratio transmission means has been selected.

* * * * *